United States Patent [19]

Huang

[11] Patent Number: 5,713,390

[45] Date of Patent: Feb. 3, 1998

[54] PRESSURE GAUGE CAPABLE OF AUTOMATICALLY DISCHARGING AIR THEREFROM

[76] Inventor: Tien-Tsai Huang, No. 4-2, Lane 30, Wu-Chang St., Pan-Chiao City, Taipei Hsien, Taiwan

[21] Appl. No.: 517,718

[22] Filed: Aug. 21, 1995

[51] Int. Cl.[6] .................................................. F16K 15/04
[52] U.S. Cl. ........................ 137/539; 137/524; 137/535; 137/557; 251/337
[58] Field of Search ............................. 137/524, 535, 137/539, 557; 251/337

[56] References Cited

U.S. PATENT DOCUMENTS

| 1,176,703 | 3/1916 | Durham | 137/524 |
|---|---|---|---|
| 1,246,892 | 11/1917 | Donnelly | 137/535 |
| 1,588,046 | 6/1926 | Nelson | 137/539 X |
| 1,838,811 | 12/1931 | Doran | 137/524 X |
| 1,934,571 | 11/1933 | Sutton | 137/539 X |
| 2,119,851 | 6/1938 | Cave | 137/535 X |
| 2,214,459 | 9/1940 | Gottlieb | 137/535 |
| 2,612,406 | 9/1952 | Kurata | 137/535 X |
| 2,954,796 | 10/1960 | Marshall | 137/524 X |
| 3,648,728 | 3/1972 | Perry et al. | 137/535 X |
| 4,777,978 | 10/1988 | Hsiao | 137/524 |
| 5,040,563 | 8/1991 | Wood | 137/524 X |

*Primary Examiner*—John Rivell
*Attorney, Agent, or Firm*—Oblon, Spivak, McClelland, Maier & Neustadt, P.C.

[57] ABSTRACT

A pressure gauge has a housing unit which includes an air inlet, an air outlet, an air chamber communicated fluidly with the air inlet, and a pressure relief chamber communicated fluidly with the air chamber via a pressure relief passage and with the outlet via a check valve. An adjustment rod is threaded on the housing unit and can be rotated so as to move in the housing unit. A reed spring is carried on the adjustment rod by a spring carrier and pushes a ball to close the upper end of the pressure relief passage. When the air pressure of the air chamber exceeds a preset value which corresponds to the position of the adjustment rod relative to the housing unit, the ball is pushed upward to disengage from the upper end of the pressure relief passage so as to permit excessive air to flow from the air chamber to the outlet. Rotation of the adjustment rod relative to the housing unit can move the reed spring in the housing unit so as to vary the pressure of the reed spring applied to the ball, thereby adjusting the preset value.

2 Claims, 5 Drawing Sheets

PRESSURE GAUGE CAPABLE OF AUTOMATICALLY DISCHARGING AIR THEREFROM

BACKGROUND OF THE INVENTION

This invention relates to a pressure gauge, more particularly to a pressure gauge which can discharge excessive air therefrom when the air pressure in the pressure gauge exceeds a preset value.

When inflated with an excessive amount of air, a tire or basket ball may break or deform after a period of use. Therefore, a device incorporated in a pressure gauge is required to prevent a tire or basket ball from being inflated with an excessive amount of air.

SUMMARY OF THE INVENTION

The main object of this invention is to provide a pressure gauge which can discharge excessive air therefrom when the air pressure in the pressure gauge exceeds a preset value.

According to this invention, a pressure gauge includes a housing unit having an air chamber formed therein, an air inlet formed in the outer surface of the housing unit in communication with the air chamber, an air outlet formed in the outer surface of the housing unit, a pressure relief chamber formed in the housing unit, and a vertical pressure relief passage which has an upper end communicated fluidly with the pressure relief chamber, and a lower end communicated fluidly with the air chamber. A check valve is interposed between the pressure relief chamber and the air outlet so as to limit air to flow from the pressure relief chamber to the air outlet. An adjustment rod is threaded on the housing unit and can be rotated relative to the housing unit so as to move the adjustment rod on the housing unit. A ball is placed in the pressure relief chamber so as to close the upper end of the pressure relief passage. A reed spring is carried on the lower end of the adjustment rod and depresses and biases the ball to close the upper end of the pressure relief passage. The rotation of the adjustment rod relative to the housing unit moves the reed spring in the housing unit so as to vary the pressure of the reed spring which is applied to the ball. When the air pressure in the air chamber exceeds a preset value which corresponds to the position of the adjustment rod relative to the housing unit, the air in the air chamber pushes the ball upward so as to open the upper end of the pressure relief passage, thus permitting flow of air from the air chamber to the air outlet via the pressure relief chamber.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
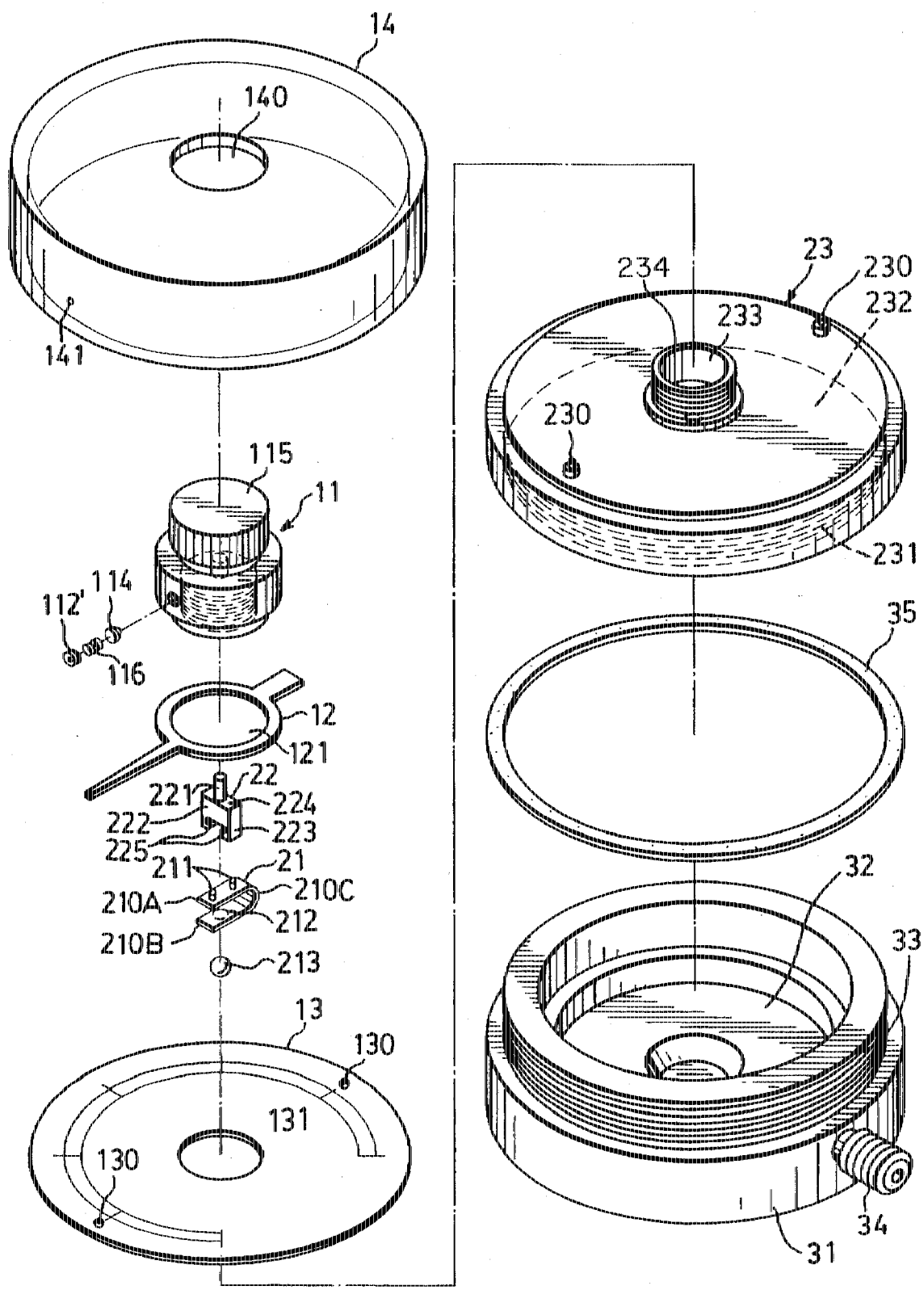
FIG. 1 is an exploded view of a pressure gauge according to this invention.
Figure 2:
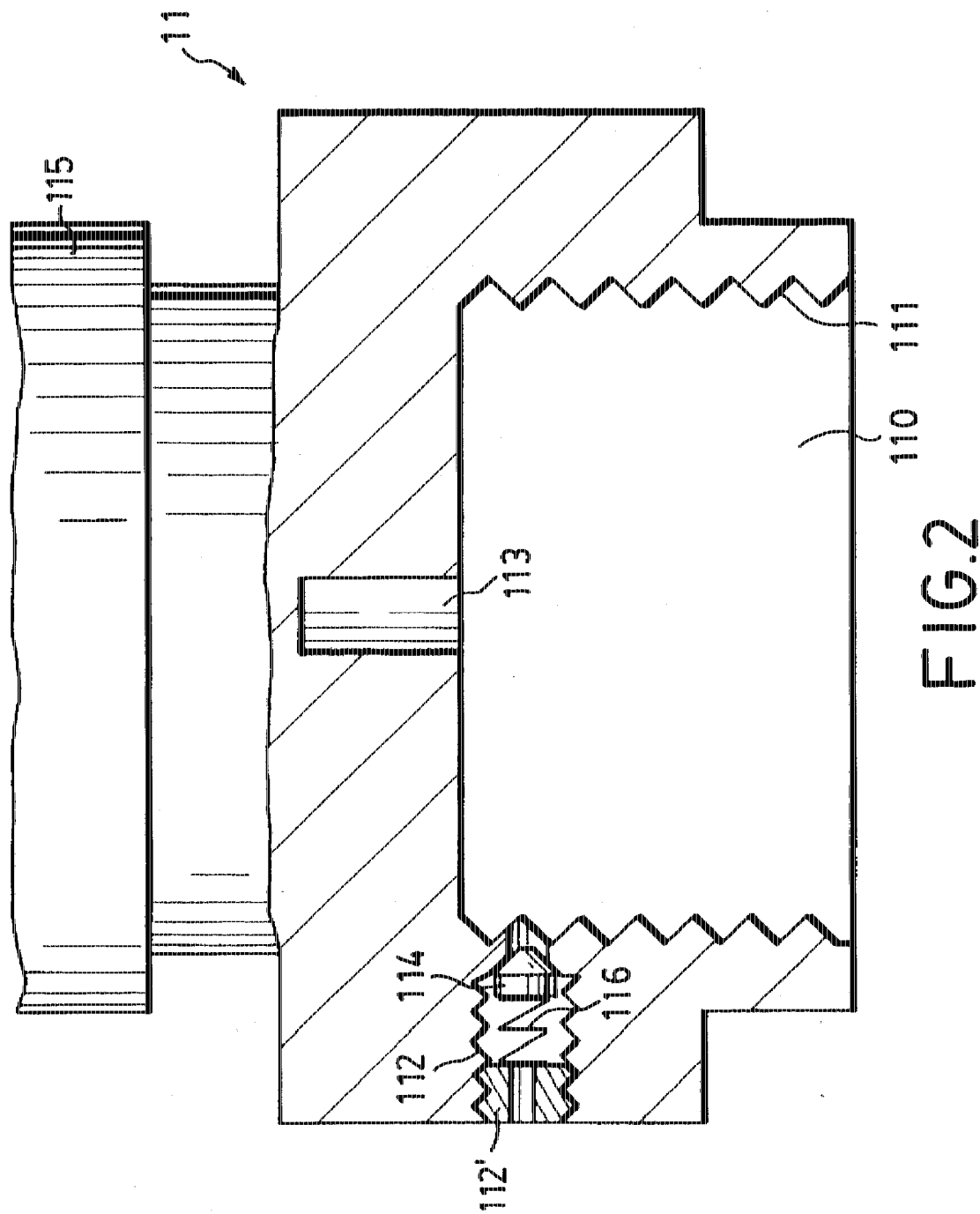
FIG. 2 illustrates the structure of the lower portion of the adjustment rod of the pressure gauge according to this invention.
Figure 3:
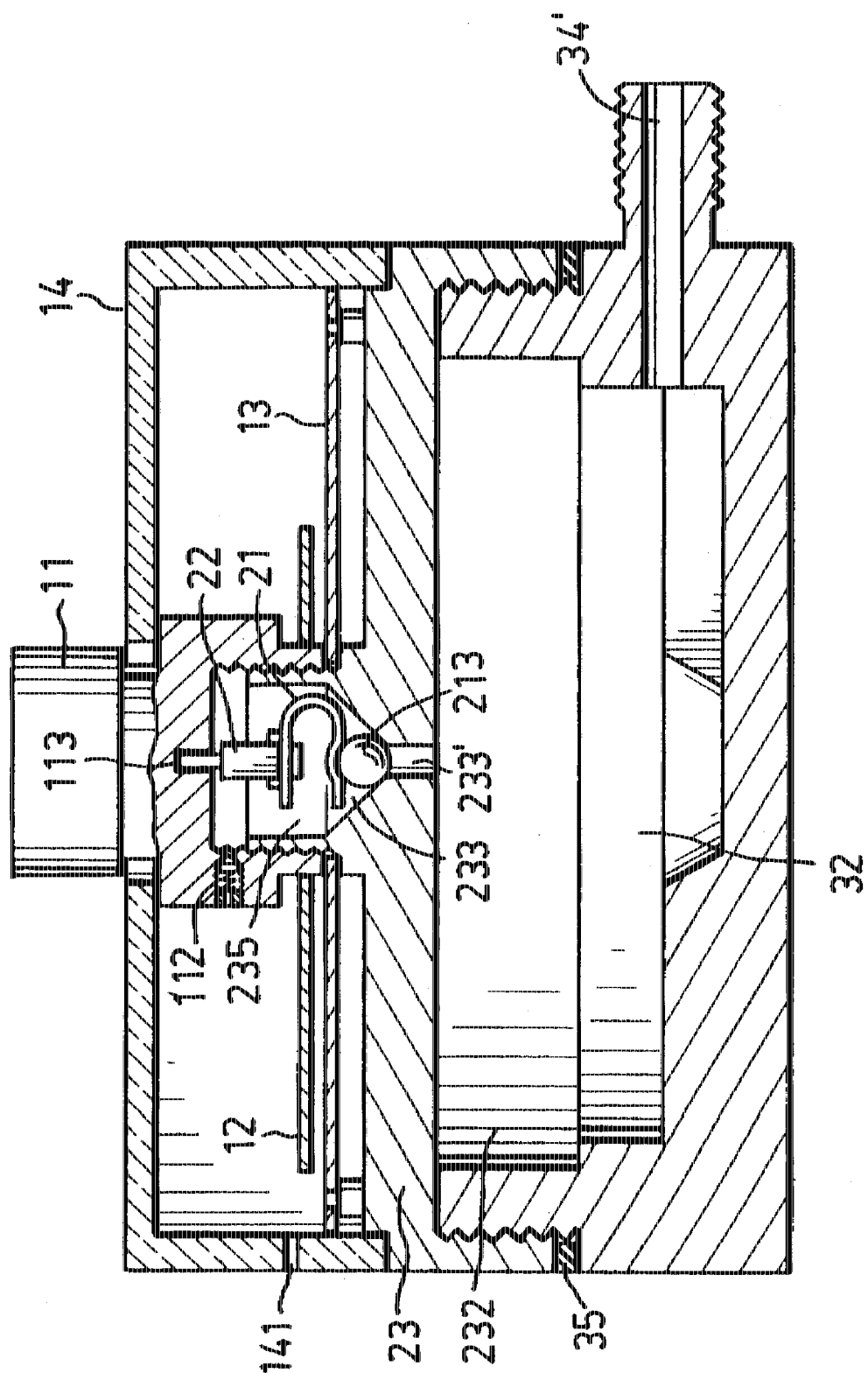
FIGS. 3 and 4 illustrate how is excessive air discharged from the pressure gauge in accordance with this invention.

Referring to FIGS. 1, 2 and 3, a pressure gauge of this invention includes an adjustment rod 11, a pressure-value indicating needle 12, a pressure-value indicating panel 13, a transparent cap 14, a reed spring 21, a spring carrier 22, an upper housing 23 and a lower housing 31. The cap 14, the upper housing 23 and the lower housing 31 together constitute a housing unit.

The upper housing 23 has an internally threaded lower end portion 231 which defines a recess 232 in the bottom surface thereof and which is engaged threadably with the externally threaded upper end portion 33 of the lower housing 31 so as to define an air chamber 32 therebetween. A seal ring 35 is interposed between the upper housing 23 and the lower housing 31 so as to establish an air-tight seal therebetween. The lower housing 31 is equipped with a connector 34 through which an entrance passage 34' is formed.

The panel 13 has two positioning holes 130 which are respectively engaged with two upright tongues 230 of the upper housing 23 so as to position the panel 13 on the upper housing 23. The upper housing 23 further has a central bore 233 formed therethrough and provided with a pressure relief passage 233', and an externally threaded hollow post 234 which is located around the central bore 233 and which extends through the central hole 131 of the panel 13 to engage threadably within the internally threaded lower end portion 111 (see FIG. 2) of the adjustment rod 11 which defines a circular recess 110 (see FIG. 2) in the bottom surface of the adjustment rod 11. A pressure relief chamber 235 is defined between the adjustment rod 11 and the upper housing 23 and is located over the pressure relief passage 233' and the ball 213. The circular recess 110 is defined by a bottom wall which is formed with a bore 113 (see FIG. 2). As best shown in FIG. 2, the adjustment rod 11 further has a rotary knob 115 and a check valve which consists of an internally threaded air passage 112 communicated fluidly with the circular recess 110, an externally threaded tubular member 112' threaded within the left end portion of the passage 112, a valve element 114 which is biased to close the reduced-diameter right end of the passage 112 by a coiled compression spring 116 which is disposed in the passage 112 between the valve element 114 and the tubular member 112'.

The cap 14 is sleeved tightly on the upper housing 23 and has a central hole 140 from which the rotary knob 115 of the adjustment rod 11 extends in order to be actuated, and an air outlet 141 which is formed through the peripheral wall of the cap 14 and which is communicated fluidly with the air passage 112 of the adjustment rod 11. The indicating needle 12 has a hole 121 formed therethrough and is sleeved tightly on the adjustment rod 11 so as to rotate the needle 12 synchronously with the adjustment rod 11.

Again referring to FIGS. 1 and 3, the spring carrier 22 is interposed between the adjustment rod 11 and the reed spring 21 so as to carry the reed spring 21 on the adjustment rod 11, and includes a neck 221 inserted into the bore 113 of the adjustment rod 11, an inverted U-shaped body 222 which has two parallel vertical arms 223 located at the lower portion thereof and which is integrally formed with the lower end of the neck 221 so as to define between the neck 221 and the inverted U-shaped body 222 a shoulder 224 abutting against the bottom wall that defines the circular recess 110 of the adjustment rod 11, and two horizontal paws 225 respectively and integrally formed with and extending inwardly from the lower ends of the vertical arms 223 so as to define two grooves which are located between the inverted U-shaped body 222 and the paws 225 respectively. The reed spring 21 has a generally horizontal upper plate 210A having two opposite sides extending through the grooves respectively and two limiting projections 211 projecting upward therefrom, a generally horizontal lower plate 210B having a circular depression 212 which is formed in the bottom surface thereof and which engages the ball 213, a C-shaped connecting portion 210C integrally formed with the upper and lower plates 210A, 210B so as to bias the ball 213 and the spring carrier 22 to move away from each other. Accordingly, the shoulder 224 of the spring carrier 22 is biased to abut against the bottom wall that defines the circular recess 110 of the adjustment rod 11, while the ball 213 is biased to close the upper end of the pressure relief passage 233'. As illustrated in FIG. 1, the paws 225 of the spring carrier 22 have tapered ends so that, in assembly of the spring carrier 22 and the reed spring 21, the upper plate 210B of the reed spring 21 can be pressed into the grooves defined between the inverted U-shaped body 222 and the paws 225 through the space between paws 225 of the spring carrier 22.

Because the limiting projections 211 are located on two sides of the spring carrier 22 and the upper plate 210A pushes the spring carrier 22 upward, when the adjustment rod 11 moves downward relative to the housing unit so as to impel the spring carrier 22 downward, the upper plate 210A of the reed spring 21 moves downward so as to reduce the distance between the distal ends of the upper and lower plates 210A, 210B, thus providing an increased pressure of the reed spring 21 applied to the ball 213 and increasing the preset value of the air pressure in the pressure gauge. When the adjustment rod 11 moves upward relative to the housing unit, the reed spring 21 pushes the spring carrier 22 upward so that the shoulder 224 of the spring carrier 22 abuts against the adjustment rod 21. As a result, the distance between the distal ends of the upper and lower plates 210A, 210B is increased, so as to reduce the pressure of the reed spring 21 applied to the ball, thereby decreasing the preset value of the air pressure in the pressure gauge. Accordingly, rotation of the rotary knob 115 relative to the housing unit can vary the preset value of the air pressure in the pressure gauge.

Figure 4:
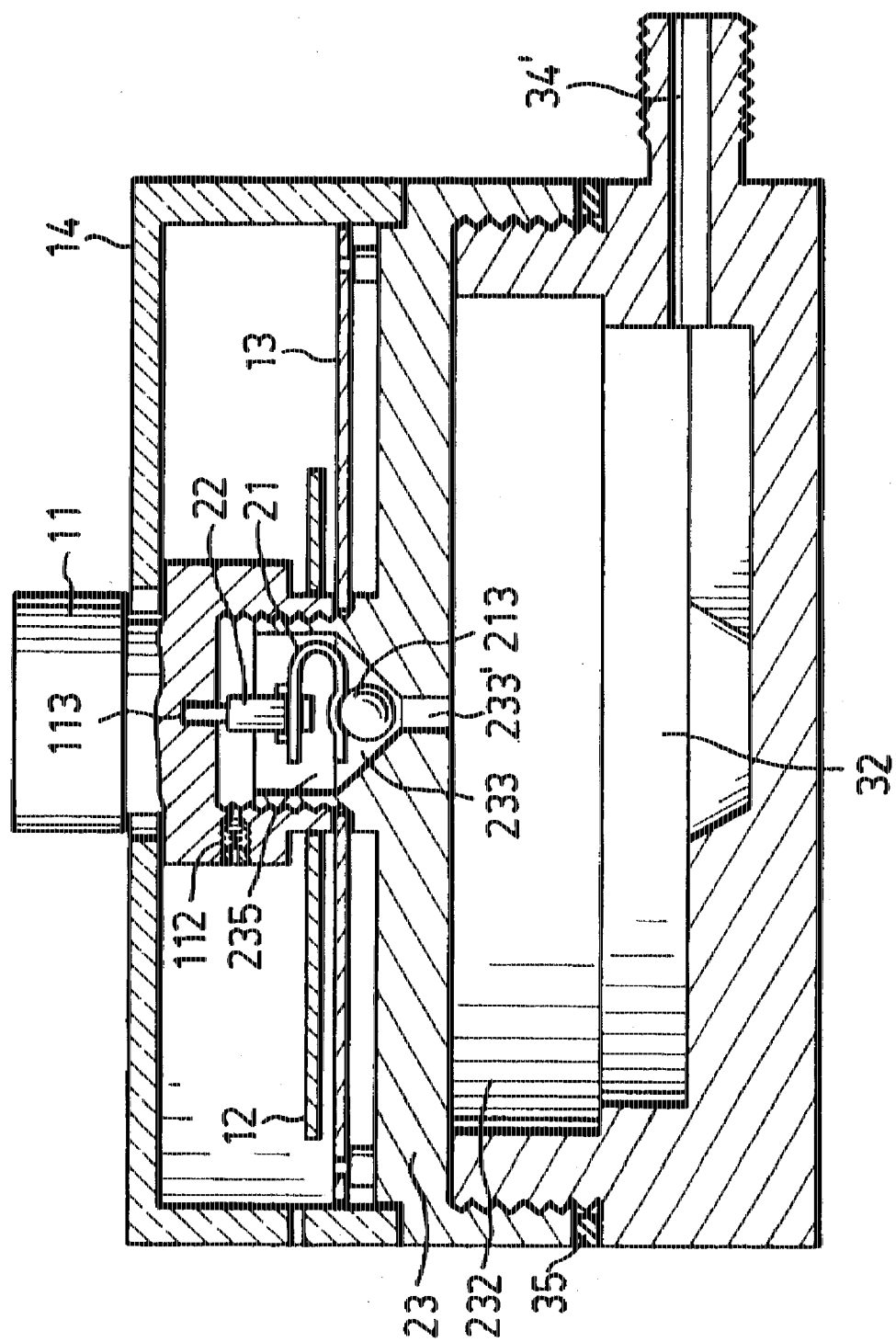

Referring to FIG. 4, when the air pressure in the air chamber 32 exceeds a preset value which corresponds to the position of the adjustment rod 11 relative to the housing unit, the air in the air chamber 32 pushes the ball 213 upward so as to open the upper end of the pressure relief passage 233', thus permitting flow of air from the air chamber 32 to the air outlet 141 via the pressure relief chamber 235. It can be appreciated that, when the connector 34 of the pressure gauge of this invention is coupled with and communicated fluidly with an inflatable article, such as a tire and basket ball, in order to measure the air pressure of the latter, if the air pressure in the article exceeds the preset value, excessive air will be discharged from the article via the pressure gauge to the atmosphere.

When it is desired to adjust the preset value of the air pressure in the pressure gauge, the rotary knob 115 is rotated relative to the housing unit so as to move the adjustment rod 11 and the reed spring 21 vertically in the housing unit, thus varying the downward pressure of the reed spring 21 applied to the ball 213.

Figure 5:
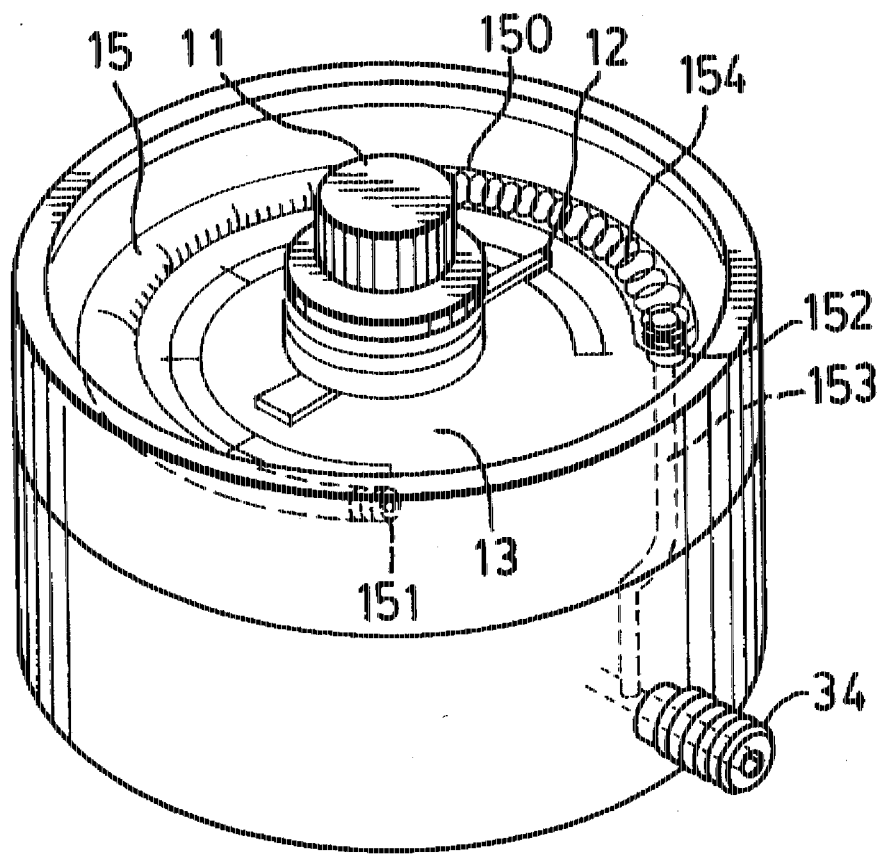
FIG. 5 is a perspective view showing the pressure gauge of this invention.

Referring to FIG. 5, the pressure gauge further includes a pressure indicating unit 15 which is disposed on the panel 13 and which includes a spring accommodating tube 150, an adjustment bolt 151 installed on the tube 150, a piston 152, an air passage 153 communicated fluidly with the air passage in the connector 34 and with the tube 150, and a coiled spring 154 received within the tube 150 and fastened to the bolt 151 at one end thereof and to the piston 152 at the other end thereof. As illustrated, the tube 150 is marked with pressure-value markings. When air is introduced into the tube 150 via the air passage 153, the piston 152 moves in the tube 150 so as to display the air pressure in the pressure gauge in accordance with the position of the piston 152 relative to the pressure-value markings. The adjustment bolt 151 can be adjusted so as to vary the spring force of the coiled spring 154.

With this invention thus explained, it is apparent that numerous modifications and variations can be made without departing from the scope and spirit of this invention. It is therefore intended that this invention be limited only as indicated in the appended claims.

I claim:

1. A pressure gauge comprising:

a housing unit comprising an air chamber, an air inlet formed in an outer surface of said housing unit in communication with said air chamber, a pressure relief chamber, an air outlet formed in the outer surface of said housing unit in communication with said pressure relief chamber, a pressure relief passage having a first end connected to said pressure relief chamber and a second end connected to said air chamber, and an externally threaded hollow post having a circular space therein;

a check valve interposed between said pressure relief chamber and said air outlet so as to limit air flow from said pressure relief chamber to said air outlet;

a ball placed in said pressure relief chamber so as to close the first end of said pressure relief passage; and an adjustment rod having a circular recess in which an internally threaded portion is formed, said adjustment rod being rotatably engaged with said externally threaded hollow post at said internally threaded portion so as to define said pressure relief chamber between said circular recess of said adjustment rod and the circular space of said externally threaded hollow post, said adjustment rod including a rotary knob at one end portion of said adjustment rod and a reed spring at an opposite end portion of said adjustment rod for biasing said ball to close the first end of said pressure relief passage, said rotary knob extending from said housing unit, whereby said ball opens the first end of said pressure relief passage when air pressure in said air chamber exceeds a preset pressure which is applied to said ball by said reed spring and which is variable by rotating said rotary knob.

2. The pressure gauge according to claim 1, wherein said circular recess has a bore formed therein, further comprising:

a spring carrier interposed between said adjustment rod and said reed spring so as to carry said reed spring, comprising, a neck inserted into said bore, a U-shaped body having two parallel arms and integrally formed with said neck so as to define between said neck and said U-shaped body a shoulder abutting said bottom surface of said circular recess, and two paws integrally formed with said arms and extending inwardly so as to define two grooves respectively which are located between said U-shaped body and said two paws; and said reed spring comprising, an upper plate having two opposite sides extending through said grooves respectively, a lower plate having a circular depression engaging said ball, and a C-shaped connecting portion integrally formed with said upper and lower plates so as to bias said ball.

* * * * *